United States Patent [19]
Ishiguro et al.

[11] Patent Number: 6,041,207
[45] Date of Patent: Mar. 21, 2000

[54] APPARATUS FOR CONTROLLING THE MOVEMENT OF MAGNETIZED DEVELOPER MATERIAL IN A LATENT, ELECTROSTATIC IMAGE DEVELOPING DEVICED

[75] Inventors: Yasuyuki Ishiguro, Higashiosaka; Yoshiaki Sanada, Ikoma; Toshihiko Takaya, Yamatokoriyama; Takahiko Kimura; Masatoshi Kaneshige, both of Ikoma; Shuuhei Yamamoto, Yamatokoriyama, all of Japan

[73] Assignee: Sharp Kabushiki Kaisha, Osaka, Japan

[21] Appl. No.: 09/140,704

[22] Filed: Aug. 26, 1998

[51] Int. Cl.⁷ ...................................................... G03G 15/09
[52] U.S. Cl. ........................................... 399/275; 399/277
[58] Field of Search ................................... 399/272, 275, 399/277, 273, 274

[56] References Cited

U.S. PATENT DOCUMENTS

| | | |
|---|---|---|
| 4,887,131 | 12/1989 | Kinoshita et al. . |
| 5,103,765 | 4/1992 | Owada et al. . |
| 5,446,526 | 8/1995 | Shimizu . |

FOREIGN PATENT DOCUMENTS

| | | |
|---|---|---|
| 37 23 425 A1 | 2/1988 | Germany . |
| Y2 3-50536 | 3/1985 | Japan . |
| 60095568 | 5/1985 | Japan . |
| 61034571 | 2/1986 | Japan . |
| B2 6-93153 | 5/1987 | Japan . |
| 62208078 | 9/1987 | Japan . |
| 64002081 | 1/1989 | Japan . |
| B2 2505800 | 4/1996 | Japan . |

*Primary Examiner*—Joan Pendegrass
*Attorney, Agent, or Firm*—David G. Conlin; David A. Tucker

[57] ABSTRACT

For realizing a satisfactory and stable developing process, the charge state of a developer and the density of toner particles contained in the developer is kept constant in the developing process. A developing roller to be driven rotationally is provided in a developing tank containing a developer. The developer is sucked magnetically using the magnetic force of a magnet provided in a developing sleeve composing the developing roller. The developer is then fed into a developing area opposed to a photosensitive member, then collected into the developing tank after the developing process is ended. The magnet is composed of an odd number of magnetic poles; developing pole, feeding pole, magnetic force distribution adjusting pole, developer sucking pole, developer separating pole, auxiliary collecting pole, and collecting pole. Between the sucking pole and the developing pole, an even number of poles are disposed. Between the developing pole and the separating pole are disposed an even number of poles. Consequently, the developer used for visualizing an image is separated while it is stuck on the developing sleeve when the developer is separated at the separating pole. When the developer is replaced, sticking of toner on the developing sleeve can be reduced significantly. In addition, the supplied developer is fixed in both toner density and charging level at the developing pole in developing.

7 Claims, 6 Drawing Sheets

◎ HIGH TONER DENSITY IN DEVELOPER
○ LOW TONER DENSITY IN DEVELOPER

Ⓜ NORMALLY CHARGED DEVELOPER
Ⓗ HIGHLY CHARGED DEVELOPER

APPARATUS FOR CONTROLLING THE MOVEMENT OF MAGNETIZED DEVELOPER MATERIAL IN A LATENT, ELECTROSTATIC IMAGE DEVELOPING DEVICED

BACKGROUND OF THE INVENTION

1. Field of the Invention

The present invention relates to a developing apparatus for use with an image forming apparatus, which visualizes a static latent image formed on a latent image bearing member using toner particles, which is a coloring material.

2. Description of Related Art

Such an image forming apparatus that has adopted an electrophotographic method used for copying machines, printers, etc. is provided with a developing apparatus composed so as to form a static latent image on the surface of a photosensitive member, which is a latent image bearing member, then supply a developing material such as toner particles (a coloring material) to the photosensitive material so that the toner particles are adhered thereon selectively to visualize the latent image.

The toner image obtained by developing the static latent image formed on the photosensitive member is transferred onto a transfer material composed of a sheet, etc. After this, part of toner particles that are not used for a transfer process remains on the surface of the photosensitive member. This unnecessary residual toner particles are removed from the surface of the photosensitive member to make the subsequent image forming to be performed repetitively. Thus, the developing apparatus is provided with a cleaning device for removing such residual toner particles from the surface of the photosensitive member after the transfer process is ended. The unnecessary residual toner particles removed by the cleaning device are then collected in a toner container provided in the cleaning device.

As the image forming apparatus provided with such a developing apparatus as described above is downsized, the space for installing an image forming device around the photosensitive member. Thus, such the recent trend toward smaller size of the image forming apparatus necessarily requires a smaller developing apparatus strongly.

Especially, a developing apparatus as described above, provided with a magnetic brush type developing roller for carrying a developing material composed of toner and magnetic carrier particles to a developing area corresponding to the photosensitive member using a magnetic force, collects residual developer particles in the developing tank after a developing process is ended. For this purpose, the collected developer is separated completely from the developing roller once in order to stabilize the developing, then new developer particles stirred and mixed enough are supplied to the developing roller. Consequently, the developing process for visualizing a latent image is stabilized, thereby high quality visual images (toner images) can be obtained.

In the prior art, after a developing process is performed by the developing roller, the tip of a scraper is put in contact with the surface of the developing roller so that collected developer particles are separated forcibly from the developing roller without fail. In such a developer separating mechanism, however, since the tip of the scraper is pressed against the developing roller, toner particles are fused and stuck on the surface of the developing roller, causing problems, for example, rising of the potential and lowering of the developer feeding force. The developing state of images is thus affected by those factors significantly, resulting in disabling of stable developing.

To avoid such troubles, therefore, an odd number of magnetic poles are composed in a magnet provided in a non-magnetic cylindrical developing sleeve composing the developing roller and those magnetic poles are disposed so that adjacent magnetic poles have the same polarity in an area where developer particles are separated from the developing roller after a developing process is ended. Consequently, developer particles are freed from the magnetic force and separated naturally from the developing roller. This is the mainstream for avoiding the above problems.

Figure 7:
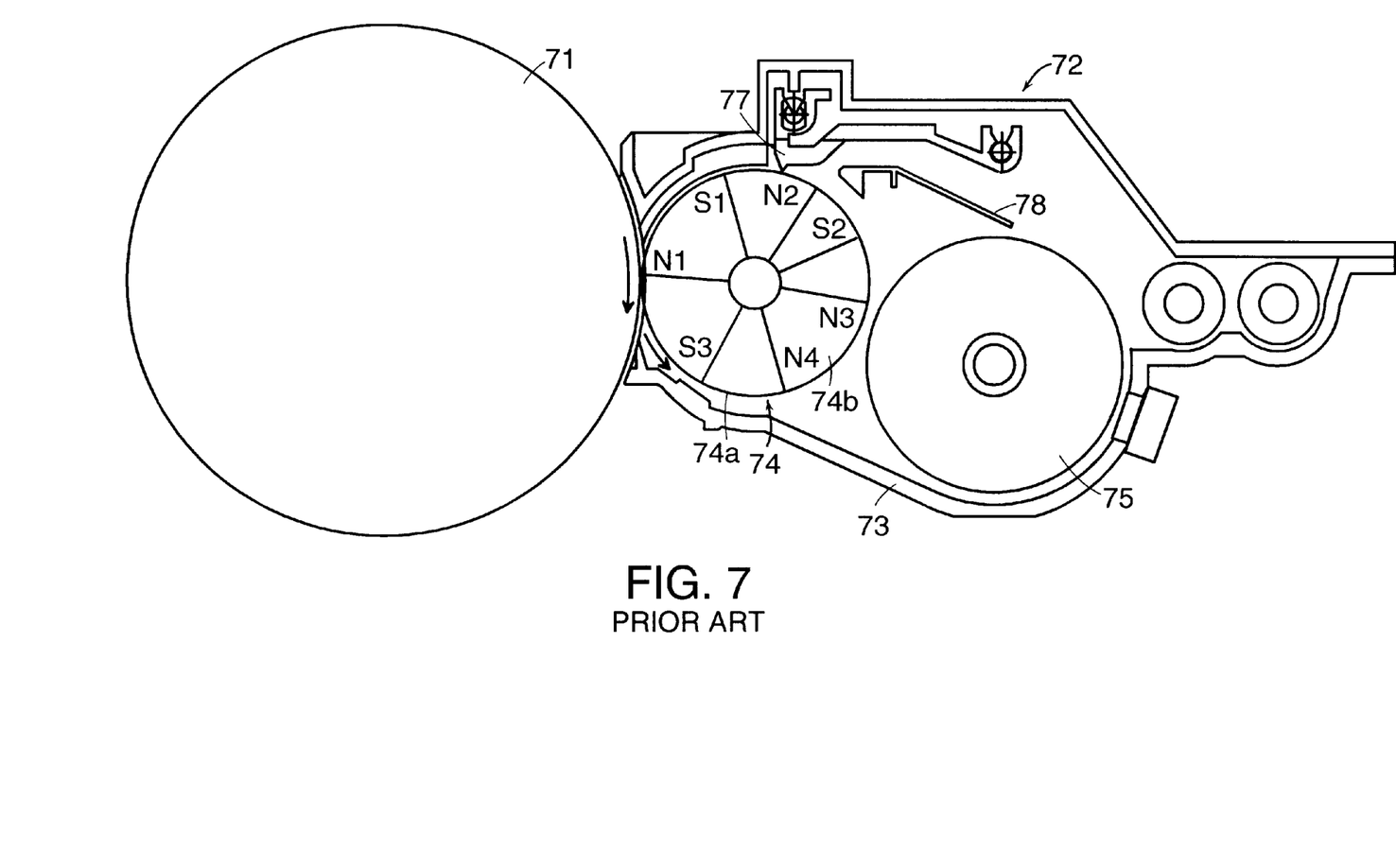
FIG. 7 is a configuration of a developing apparatus adopting a prior art configuration of magnetic poles.

For example, as shown in FIG. 7, a developing apparatus 72 used to visualize a static latent image formed on a photosensitive member 71 is disposed so as to be opposed to the photosensitive member 71, which is a latent image bearing member. The developing apparatus 72 is provided with a developing roller 74 rotationally so as to be opposed to, especially, the opening of a developing tank 73 containing a developer composed of toner and carrier. The developing roller 74 is exposed partially at the opening of the developing tank 73 so as to be disposed at a distance from the photosensitive member 71.

The developing roller 74 is composed so as to provide a magnet 74b in a non-magnetic cylindrical developing sleeve 74a. The magnet 74b, as illustrated, is composed of an odd number of magnetic poles; a developing pole N1 corresponding to the developing area; a feeding pole S1 and a collecting pole S3 in adjacent to each other and with the developing pole N1 therebetween; a magnetic force distribution adjusting pole N2 in adjacent to those magnetic poles S1 and S3; a developer separating pole N4; an auxiliary feeding pole S2 adjacent to the pole N4; and a sucking pole N3 for sucking a developer onto the surface of the developing roller. In such a magnet 74b, 7 poles are provided. The magnetic force becomes almost zero at the magnetic poles N3 and N4 where the polarity of N3 and N4 becomes the same as that of respective adjacent poles. Thus, the developer is separated naturally from the developing roller 74.

Corresponding to the developer separating area described above, a stirring & feeding roller 75 is disposed. The roller 75 formed like a screw is used to stir and supply a developer. This stirring & feeding roller 75 stirs both toner and carrier particles fed to itself enough so as to be charged properly. The roller 75 supplies stirred developer particles to the developing roller 74. At this time, new developer particles are sucked onto the magnetic poles of the sucking pole N3 in the magnet 74b, so that the developer is fed to the next process.

The amount of the developer sucked and fed by the developing roller 74 is limited by a limiting member (doctor) 77 to a predetermined amount around the magnetic force adjusting pole N2. The developer limited and removed from the developing roller 74 is returned to the stirring & feeding roller 75 passing on top of a collecting plate 78. The developer is stirred and fed again to the developing roller 74. The developer passing the limiting member 77 is fed to the developing pole N1 via the feeding pole S1 positioned just before the developing pole N1, so that it is used for developing another latent image.

The developer rises like brush hair at the developing pole N1 in the magnetic force line direction and rubbed by the photosensitive member 71 thereby to develop a latent image. After this developing process, the developer is fed to the separating pole N4 via the collecting pole S3 and demagnetized and separated from the surface of the developing sleeve 74a. The developer is then stirred by the stirring & feeding roller 75 opposed to the developing sleeve 74a.

The magnetic pole direction, the magnetic force, and the number of poles of the magnet 74b forming a route for circulating and feeding the developer to the developing position, then to the separating position in the developing tank 73, are decided taking the system balance into consideration (especially taking a process speed into consideration). If the process speed is fast, sometimes the developer is fed to the developing area before the developer is not stirred and mixed enough. Consequently, the toner is used f or developing while the toner charging is insufficient and the toner density is not kept at a fixed value. As a result, image blushing and insufficient density problems are apt to arise.

In addition, if the stirring & feeding roller 75 is reduced in diameter and only one roller is used (usually, two rollers are used) to cope with a smaller apparatus, the developer is supplied to the developing roller 74 before the supplied toner is not stirred and mixed enough in the longitudinal direction of the stirring &feeding roller 75. As a result, image blushing and insufficient density will occur more often.

Figure 11:
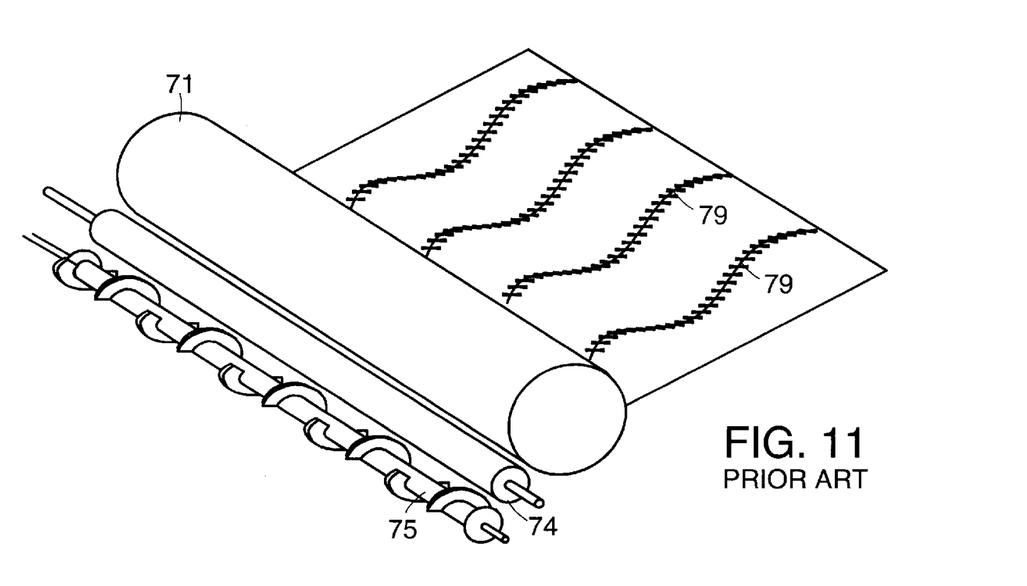
FIG. 11 illustrates how an image is formed in half-tone developing in the prior art developing apparatus shown in FIG. 7.

In order to solve such problems, generally, the shapes of the screw and the blades of the stirring & feeding roller 75 are contrived. For example, it is already known that if the tip of a roller blade comes in contact with the developer stuck on the developing roller by its magnetic force, the amount of charged developer particles is increased at the portion immediately, thereby it appears as density nonuniformity in developing a half tone image. For example, as shown in FIG. 11, when a toner image is transferred onto paper after a developing process, stripes 79, each different in density from others, appear in the half tone image.

There is another countermeasure to prevent the above problems; the rotation speed of the stirring & feeding roller 75 is increased. This countermeasure, however, applies much stress to the developer. Thus, the rotation speed of the roller 75 must be decided taking various balances into consideration. And, even when the above balances are examined fully, it was difficult to obtain stable developing characteristics, since the developer condensing property was changed due to the ambient conditions including temperature, humidity, and heat generated by the speeded-up rotation of the stirring & feeding roller 75.

Furthermore, a developer cannot be replaced satisfactorily on the outer periphery surface of the developing roller 74 if the prior art magnetic poles of the magnet 74b are disposed as shown in FIG. 7. When the toner particles are moved from the developing roller 74 to a static latent image in the developing area, therefore, consumption of the toner on the surface of the developer is started at the outermost portion. Thus, many ghosts (ghost; a phenomenon causing a toner image to be whitened or blackened, since a pattern depending on an amount of toner consumed in the developing area appears as an image memory in the next process) occur. In order to make the developing apparatus compact in size, therefore, the developing apparatus is confronted with many problems. And, finally, the configuration of the developing apparatus will become complicated.

In the case of a developing apparatus that uses a two-component developer, the positions of the magnetic poles and the magnetic force distribution of the magnet are changed delicately, since the magnetic poles of the internal magnet affect each other. This is why it is not easy to distribute the magnetic force to the function of each portion on the developing roller. The relationship between the function of each portion of the developing roller and the function of the whole magnet is not cleared yet.

The magnetic force of each of the magnetic poles is varied according to not only the distribution of the magnetic force of the magnet, but also according to the magnetism of carrier particles and the amount of the carrier sucked on the surface of the developing roller when the carrier particles included in the developer lie therebetween. In addition, according to the speed of the sleeve rotating independently of the magnet provided in the developing roller, the moving or transition state of the magnetic force is varied significantly. This is well known through experiences. The mechanism is not disclosed yet, however.

Japanese Examined Utility Model JP-Y2 3-50536 (1991) has disclosed that if th e magnet incorporated in the developing sleeve of the developing roller composing the developing apparatus described above is composed so that a flat magnetic pole is provided at a site corresponding to each function and the magnetic force and the magnetic flux distribution are defined, then the stress applied to the developer is reduced while the developer (a mixture of toner and carrier) is supplied to the developing sleeve, as well as the risen portion of the developer is limited, and the developer is separated from the developing sleeve and collected into the developing tank.

Furthermore, the official report of Japanese Examined Patent Publication JP-B2 6-93153 (1994) has disclosed a method for preventing scattering and falling of toner and carrier particles in the developing area by setting a composite magnetic field vector (a magnetic field component vector obtained by compounding the magnetic field component in the radial direction and the magnetic field component in the tangential direction) larger than the peak value of the magnetic field component in the radial direction on the sleeve of the developing pole around the developing pole of the magnet and setting the range within 45 degrees from the center of the developing pole.

Furthermore, Japanese Patent Number. JP-B2 2505800 has disclosed a method for stabilizing the packing state of both toner and carrier particles by easing the magnetic density distribution curve at the downstream side more than at the upstream side in the feeding direction of the developer with respect to the developer supply magnetic pole distribution.

In recent years, as processings in a copying machine and a printer are getting faster and faster, technologies for securing a certain developing performance in the developing area are also required for a developing apparatus. One of those technologies is to make the outer diameter of the developing roller larger and larger thereby to increase the nip more in width (a range for a developer to come in contact with in a developing process) between the photosensitive member and the developing roller in the developing area. Because of this enlargement, the number of magnetic poles of the fixed magnet provided in the sleeve composing the developing roller is also increased. And, when the number of magnetic poles of the fixed magnet is increased, it also becomes complicated to decide each of parameters of the magnetic pole direction, the magnetic force, and the number of magnetic poles. In order to improve this, therefore, it is needed to study the developer and the mechanism of the function of the entire magnet. Thus, the disposing of the magnetic poles and the magnetic force configuration of the magnet in the developing apparatus described in the above Patent Publications cannot cope with the above problems any longer.

Hereunder, therefore, the problems of the prior art developing apparatus shown in FIG. 7 will be described in detail.

Figures 8, 9:
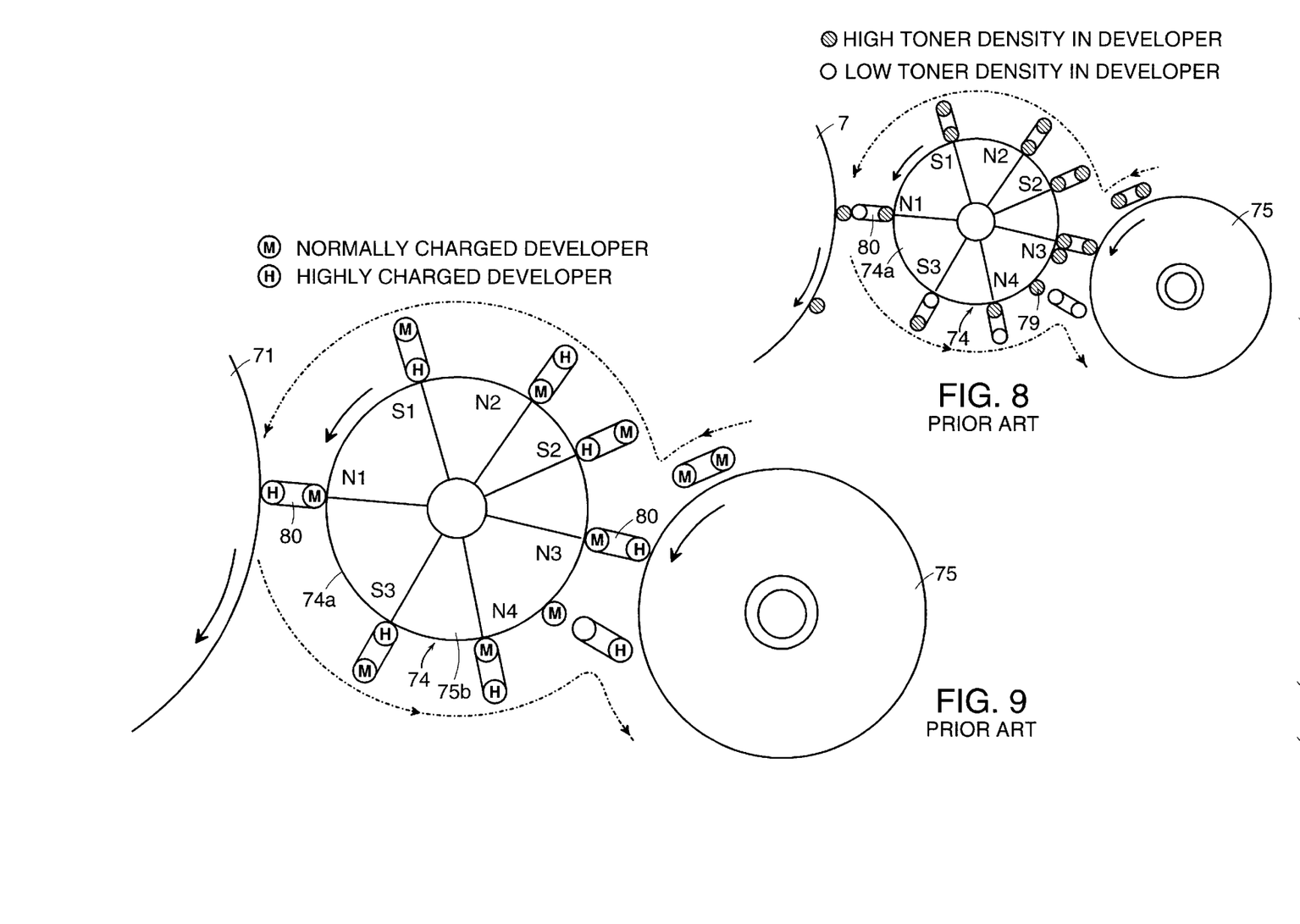
FIG. 8 illustrates a relationship between a toner density in the developer and how the developer is fed in the prior art developing apparatus shown in FIG. 7.
FIG. 9 illustrates a relationship between a state of charged toner particles in the developer and how the developer is fed in the prior art developing apparatus shown in FIG. 7.

In the developing apparatus shown in FIG. 7, how the image quality is degraded according to a change of toner density will be described with reference to FIG. 8. In FIG. 8, the developing tank 73 is not illustrated. At first, how a developer flows in the developing apparatus will be described.

(1) Toner particles supplied from a toner supply part (for example, a toner cartridge) are stirred and mixed with carrier particles in a developer by the stirring & feeding roller 75. This is initial charging of the toner.

(2) After the initial charging, the developer is sucked by the sucking pole N3 of the fixed magnet 74b provided in the non-magnetic developing sleeve 74a. At this time, the developer is rubbed strongly between the sucking pole N3 and the stirring & feeding roller 75 as shown in FIG. 9, thereby the developer is charged more highly at the stirring & feeding roller 75 than at the developing roller 74 (charged more at the tip of each risen portion of the developer).

Figure 2A:
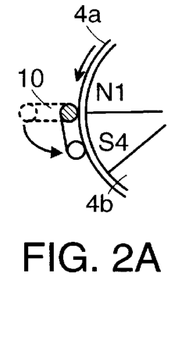
FIGS. 2A to 2C illustrate how a developer is rotated/fed on the developing roller, which is a member of the developing apparatus.
Figure 2B:
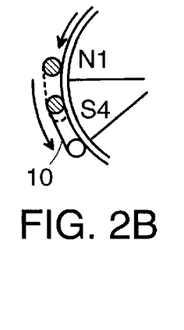
Figure 2C:
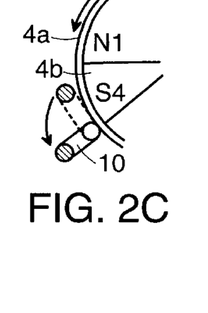

(3) Toner particles in the developer are rubbed against the stirring & feeding roller 75 so as to be charged together with carrier particles, then fed to the doctor 77 according to the rotation of the developing sleeve 74b after a process (2) is ended. A verification example for how the developer is fed will be described later. As shown in FIGS. 2A to 2C, when the developer is f ed to the next pole at the downstream side in the rotational direction of the developing sleeve sequentially, the developer is rotated and moved repetitively. Each risen portion of the developer i s assumed as a unit at this time.

(4) The interval between the developing sleeve 74a and the doctor 77 is decided to be a predetermined thickness experimentally. The N2 pole and the S1 pole are disposed in order from the upstream side in the rotational direction of the developing sleeve 74a with the doctor 77 therebetween, so that a fixed amount of developer is held on the developing sleeve 74a.

(5) The developer having passed the doctor 77 is fed into the developing area at a proper thickness. Then, the developer is rotated thereby to develop a static latent image on the photosensitive member accordingly. After this developing, the developer is collected into the developing tank 73.

(6) The developer having returned into the developing tank is separated from the surface of the developing sleeve 74a between the magnetic poles N4 and N3 of the magnet 74b. The developer is then stirred again by the stirring & feeding roller 75 thereby to adjust the amount of toner particles to be stuck on the surface of each of carrier particles to a fixed amount. Thus, the process (1) is repeated.

In the processes (1) and (2), when the developer passes the pole N1 once, the toner in the developer is moved toward the photosensitive member 71 according to a static latent image formed on the photosensitive member 71. In this case, the toner movement is started at the risen portion of the developer, closer to the photosensitive member 71. If the gap between the photosensitive member 71 and the developing sleeve 74a is smaller than the risen portion of the developer, the tip of the developer looks broken while in contact with the developing sleeve. After leaving the developing area, however, the risen portion of the developer on the surface of the developing sleeve 74a changes its height and amount while it is moved. Consequently, the state of the developer 80 becomes as follows after leaving the developing area; the toner density becomes low at the photosensitive member 71, that is, at a portion away from the surface of the developing sleeve 74a and high at the surface of the developing sleeve 74a as shown in FIG. 8.

In the above state, the developer is fed to the stirring & feeding roller 75 according to the rotation of the developing sleeve 74a. When the developer reaches the collecting pole S3, the developer in which much toner is stuck on each of carrier particles is stuck more at a portion away from the surface of the developing sleeve 74a. In addition, when the developer is fed toward the stirring roller, the developer in which much toner is stuck on each of carrier particles is found more on the surface of the developing sleeve 74a and the developer is separated from the surface of the developing sleeve 74a between the separating pole N4 and the sucking pole N3. New developer particles are supplied at the stirring & feeding roller 75, repeating the processes (1) to (6) described above. Thus, the developer is circuited and fed in the developing apparatus.

At this time, as shown in FIG. 8, part of toner particles 79 are stuck on the surface of the developing roller 74a between the separating pole N4 and the sucking pole N3, thereby a thin skin layer is formed with the stuck toner particles 79.

In addition, in the case of the prior art, the toner particles in the developer 80 are charged much more at the stirring & feeding roller 75 (away from the outer periphery surface of the developing sleeve), since the developer is rubbed against the stirring & feeding roller 75 at the developer sucking pole N3 as shown in FIG. 9. The developer in this state is rotated and moved to the next pole repetitively as shown in FIGS. 2A to 2C. Each risen portion is assumed as a unit at this time.

When the developer 80 reaches the developing pole N1, the developer in which toner particles are charged more comes to the photosensitive member 71 (away from the surface of the developing sleeve 74a).

Consequently, if the magnetic poles are disposed just like in the prior art magnet shown in FIG. 7, then the toner particles charged more partially after they are rubbed against the stirring & feeding roller 75 are used for developing in the developing area. This will then arise a problem that non-uniformity and blushing appear in images remarkably. This is also true in the developing apparatus described in each of the above Patent Publications.

Furthermore, if the collecting pole S3 is provided around the top (closest to the guide) of the guide 73a of the developing tank 73, the pressure for making the developer come in contact with the guide 73a is increased, thereby the toner is apt to scatter and blow out more frequently.

If the developer is not supplied enough to the sucking pole N3 opposed to the stirring & feeding roller 75, it causes a developing nonuniformity corresponding to the rotation of the blade of the stirring & feeding roller 75 (having a width corresponding to the thickness of the blade of the roller) thereby to reduce the uniformity of the half-tone density. Thus, stripe-like meandering uneven portions appear in images as shown in FIG. 11 as developing nonuniformity to appear in the prior art developing apparatus.

It was found that such a phenomenon was apt to occur when only one stirring & feeding roller was used to simplify a high speed machine with fast process speed and a stirring structure.

Figure 10:
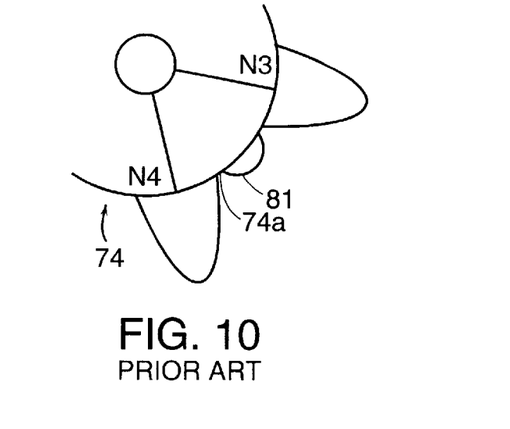
FIG. 10 illustrates how the magnetic force is distributed in a separating area of the developer shown in FIG. 7.

Furthermore, if the interval between the separating pole N4 and the sucking pole N3 is wide, a composite magnetic field component (repulsive magnetic force) 81 appears on the surface of the developing sleeve 74a between the poles N4 and N3, which has only a weak magnetic force originally as shown in FIG. 10. Thus, the developer is not separated completely from the surface of the developing sleeve 74a and accordingly the developer is not replaced completely with new one. This causes the image nonuniformity and the toner scattering.

SUMMARY OF THE INVENTION

Under such circumstances, the present inventor has found the optimized disposition of the magnetic poles of a magnet as a result of study of a mechanism for the feeding of a developer. Accordingly, it is an object of the present invention to provide a developing apparatus that solves the prior art problems discussed above.

To accomplish this objective, the present invention provides a developing apparatus for image forming apparatuses. The developing apparatus includes a developing tank for containing a developer composed of toner and carrier; a cylindrical developing sleeve provided in the developing tank and driven rotationally; and a magnet fixed inside the developing sleeve that acts to suck developer onto the surface of the developing sleeve. The developing apparatus is installed in the image forming apparatus together with a static latent image-bearing member on which a static latent image is adapted to be formed. This member may also be used to visualize the static latent image.

More particularly, the magnet includes an odd number of magnetic poles disposed in the rotating direction of the developing sleeve. One of these magnetic poles is a developing magnetic pole located opposite to the latent image-bearing member. Further, additional ones of these poles include a developer separating magnetic pole and a developer sucking magnetic pole having the same polarity as the developing pole. These poles are disposed sequentially relative to the rotating direction of the developing sleeve downstream of the developing pole. Further, even numbers of additional magnetic poles are disposed downstream of the developing magnetic pole and the developer sucking magnetic pole, respectively.

According to the configuration described above, the developer is collected in the developing tank after the developing process is ended. Specifically, the developer is separated from the surface of the developing sleeve in a separating position, especially at the position located between adjacent magnetic poles of the magnet that have the same polarity. In this case, the developer used for developing is positioned on the surface of the developing sleeve, and the developer is separated from the developing sleeve while a low toner density portion is opposed to the surface of the developing sleeve. Consequently, the occurrence of the phenomenon that toner particles are left on the surface of the developing sleeve is reduced significantly. Accordingly, such a toner layer as may be left on the surface of the developing sleeve after the separation is small. Consequently, the density and charging state of the toner in the developer are stabilized in the developing operation, and factors that tend to degrade the quality of the completed image, such as image non-uniformity, blushing, etc., may be prevented.

The invention is also characterized in that a magnetic force generated by the magnetic poles between the developing magnetic pole and the developer separating magnetic pole has such a strength that a rise of the developer becomes as small as possible.

In the configuration described above, the developer can be fed and collected surely with a minimum configuration of magnetic forces. Further, when collecting the developer, scattering of the toner caused by hitting of the developer against the guide of the developing tank can be prevented.

Hence, the developer can be fed surely, and it may be expected that the effect obtained by the developing apparatus as described above will be improved over the prior art.

The present invention is also characterized in that the magnetic poles include an even number of magnetic poles disposed upstream of the developing magnetic pole relative to the rotational direction of the sleeve, that is between the developing magnetic pole and the developer separating magnetic pole.

Since the developing apparatus of the present invention is as described above, when developer is fed to the developing area, the toner that is highly charged gathers on the surface of the developing sleeve, so that the toner that is stably charged is rubbed against the latent image bearing member. Thus, the developing is made satisfactory. For example, in the developing of a half-tone image, the image is developed properly, and without any stripes caused by density non-uniformity of the toner as shown in FIG. 11.

The present invention is also characterized in that preferred embodiments of the developing apparatus may include a rotating member disposed opposite to the developing sleeve on the opposite side thereof from the latent image bearing member. This rotating member is for stirring the developer and for delivering the developer to the developing sleeve. It also causes the toner in the developer delivered to the developing sleeve furthest from the surface of the developing sleeve to have a greater charge than that adjacent to the surface of the sleeve. This enhances the desired effect of the invention.

The invention is further characterized in that a magnetic force generated by the developer separating magnetic pole is stronger than a magnetic force generated by the developer sucking magnetic pole.

Given the above described configuration, the developer can be surely separated from the developing sleeve when being collected in the developing tank after the developing process has been completed. Thus, used developer is replaced with new developer material that has been stirred and mixed sufficiently, prior to the repetition of the developing operation so as to improve the final image in comparison to that obtainable by the prior art.

Accordingly, it will be understood that in the present developing apparatus the disposition of the magnetic poles within the developing sleeve has been altered relative to that taught by the prior art. In other words, the magnet poles of the magnet are disposed in the proper configuration to stabilize the developing operation. Thus, high quality images may be produced.

A high potential portion of the developer, which is a high-charge-density toner portion, is separated surely after the developing operation is ended. Thus, the surface of the developing roller is prevented from retaining toner particles stuck to it, and substantially the entire layer of developer on the surface of the developer sleeve can be replaced during each cycle of the developing operation. This acts to stabilize the developing operation and result.

Furthermore, the angle between the magnetic poles, and the magnetic force of each pole, are properly set to further improve the result of the developing operation. This is particularly true with regard to the removal and replacement of depleted developer after each cycle of the developing operation.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
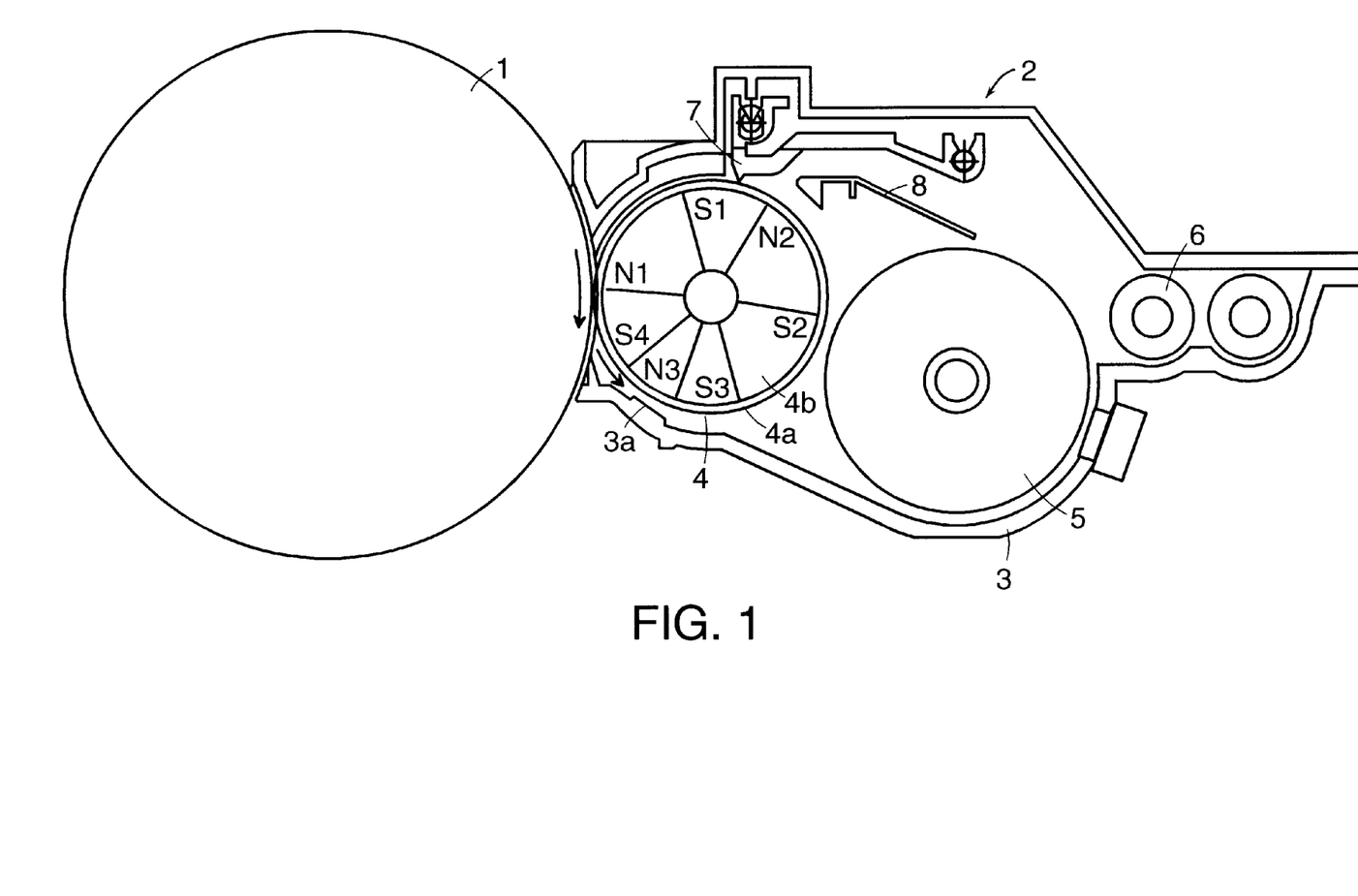
FIG. 1 illustrates a configuration of a developing apparatus of the present invention, opposed to a photosensitive member bearing a static latent image.
Figure 3:
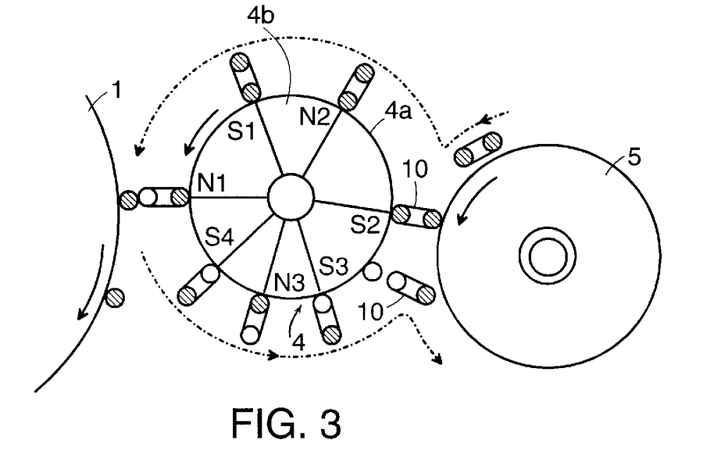
FIG. 3 illustrates a relationship between a toner density in the developer and how the developer is fed, to explain first embodiment of the developing apparatus of the present invention.

The first preferred embodiment of the developing apparatus of the present invention will be described with reference to FIGS. 1 to 3. FIG. 1 is a cross sectional view of the developing apparatus of the present invention, opposed especially to a photosensitive member used as a latent image bearing member in an image forming apparatus. FIG. 2A to 2C illustrates how a developer is rotated and fed on the surface of a developing roller in the developing apparatus of the present invention. FIG. 3 illustrates how the developer is flowing, especially, how the developer is fed with respect to a toner density, to describe the first embodiment of the present invention in detail.

In FIG. 1, a photosensitive member 1 formed into a drum shape is disposed almost in the center of the image forming apparatus body and driven rotationally at a fixed speed in the direction of an arrow when in forming an image. On this photosensitive member is a static latent image is borne, that is, formed. Various image forming process means (not illustrated) are disposed around this photosensitive member 1 so as to be opposed to the photosensitive member 1 respectively.

As for the apparatus composing the image forming process, only the photosensitive member 1 and a developing apparatus 2 of the present invention are shown in FIG. 1. The various means for forming images are a charger that charges the surface of the photosensitive member 1 in uniform; an optical system that irradiates an image with a light according to the image (not illustrated); a developing apparatus 2 of the present invention, used to visualize a static latent image formed on the photosensitive member 1 after being exposed by the optical system; a transfer unit for transferring the developed image (toner image) onto a sheet of paper fed as needed; a separating charger for separating the paper from the photosensitive member 1 after the transfer process; a cleaning device, which is one of image processing devices, used to remove residual developing material (toner) remained on the surface of the photosensitive member 1 after the transfer process is ended; a static eliminator for eliminating charged particles remained on the surface of the photosensitive member 1, etc., which are all disposed in this order in the rotating direction of the photosensitive member 1.

Many sheets of paper are stacked in, for example, a tray or a cassette. A sheet of the stocked paper is fed by a paper feeding means into the transfer area opposed to the photosensitive member 1, where the transfer unit is disposed. At this time, the paper is fed so as to be aligned to the leading end of the toner image formed on the surface of the photosensitive member 1. The paper, after the image is transferred, is separated from the photosensitive member 1 in the transfer/separating charger, then fed into a fixing apparatus.

The fixing apparatus fixes a toner image transferred onto a sheet of paper as a permanent image. The fixing apparatus includes a heat roller heated up to a temperature for fusing toner and fix the toner image on its surface opposed to the toner image. The fixing apparatus also includes a pressure roller pressed against the heat roller and used to make the paper come in contact closely with the heat roller. The paper passing through this fixing apparatus is ejected outside the image forming apparatus via an ejection an roller.

On the other hand, the developing apparatus 2, as shown in FIG. 1 in detail, includes a developing roller 4 provided rotationally and a stirring & feeding roller 5 for feeding and/or stirring the developer in its developing tank 3 containing the developer. In the developing tank 3 on the right side in FIG. 1 are also provided a screw roller 6, etc. for feeding toner supplied into the developing tank 3 as needed.

The developing roller 4 has a magnet 4b composed of many magnetic poles in a cylindrical non-magnetic sleeve 4a. The sleeve 4a is driven rotationally in the direction of an arrow. The magnet 4b is usually fixed. Especially, a developing pole N1 of the magnet 4a is positioned at an opening of the developing tank 3 so as to be opposed to the photosensitive member 1. Consequently, the developer is sucked onto the sleeve 4a due to the magnetic force of the magnet 4b and fed to the developing area opposed to the photosensitive member 1 by means of the rotation of the sleeve 4a. Then, the developer rises like brush hair at the position of the pole N1 of the magnet 4b and rubbed against the surface of the photosensitive member 1 thereby to develop an static latent image formed on the surface of the photosensitive member 1.

The developer is composed of two components, for example, toner and magnetic carrier. The toner is rubbed and charged by an action such as stirring of the stirring & feeding roller 5 thereby to be stuck on the carrier. The developer is then sucked onto the surface of the sleeve 4a so as to be fed to the developing area. Part of the developer, before being fed to the developing area, is removed by a limiting member (doctor) 7 so that the amount of the sucked developer is fixed. In other words, the doctor 7 is fixed to the developing tank 3 at its one end and is disposed at a certain interval from the sleeve 4a at its other end, and the developer passing through this doctor 7 is limited to a fixed amount.

According to the configuration as described above, the developer in the developing tank 3 is stirred enough by the stirring & feeding roller 5, so that the toner in the developer is charged with a predetermined polarity, for example, positive polarity. This charged developer is supplied to the developing roller 4 due to the function of the stirring & feeding roller 5. The developer is then sucked onto the developing roller 4, for example, magnetically and fed to the developing position.

The developer, which is not used in a developing process, is collected into the developing tank 3 and separated from the developing roller 4 and stirred by the stirring & feeding roller 5 and supplied again to the developing process.

Hereunder, an embodiment of the developing apparatus of the present invention will be described.

First Embodiment

The magnet 4b of the developing roller used in the developing apparatus 2 of the present invention is composed of an odd number of magnetic poles (7 poles) disposed on a surface opposed to the developing sleeve 4a. In this invention, the number of magnetic poles is not limited specially, but it is preferable to construct the magnet 4b of odd number of magnetic poles, at least 5 poles or more for a reason to be described later in detail.

Concretely, the magnet 4b is composed of a developing pole N1 opposed to the developing area, a feeding pole S1 adjacent to the N1 pole for feeding a developer to the developing pole N1, a collecting pole S4 for collecting the developer into the developing tank after a developing process is ended, the poles S1 and S4 being disposed to sandwich the N1 pole, a magnetic force distribution adjusting pole N2 adjacent to the poles S1 and S2, for limiting the amount of the developer to be stuck, an auxiliary collecting pole N3 for further feeding the developer to be collected, and a sucking pole S2 adjacent to the poles N2 and S3, for sucking the developer supplied by the stirring & feeding roller 5, and a separating pole S3 for separating the collected developer from the developing sleeve 4a.

In other words, according to the present invention, an even number of magnetic poles are disposed in the magnet 4b, up to the separating pole S3 including the developing pole N1. Since such the configuration is taken for the magnetic poles, when the developer is separated at the separating pole S3, a high toner density portion and a high charged toner potential portion in the developer go far from the developing sleeve 4a, so that it is prevented significantly that the toner is stuck and left on the developing sleeve 4a. This function will be described later more in detail. Thus, the configuration can prevent a phenomenon that the surface of the developing sleeve is covered by residual toner, and accordingly unnecessary charging, etc. can be eliminated thereby to solve factors of image nonuniformity, etc.

Hereunder, a result of examination for explaining the above description in detail will be described.

In the case of the developing tank 3 containing a two-component developer as described above, the toner particles in a developer used for forming monochrome images mean mainly the toner particles included in the developer on the developing sleeve 4a, formed like magnetic brush hair on the latent image potential surface side, that is, formed in the developing area and rubbed against the photosensitive member 1.

Generally, as is shown in FIGS. 2A to 2C, the developer is held on the surface of the developing sleeve 4a by means of the magnetic force of the magnet 4b provided in the developing sleeve 4a and the charging amount of the developer. The developer is thus rotated with a centrifugal force due to the rotation of the developing sleeve 4a. At this time, the carrier in the developer 10 magnetized by itself rises like a chain on the developing sleeve 4a.

On the other hand, according to the rotation of the developing sleeve 4a, the developer 10 rising like brush hair is inclined (due to the magnetic field component and the developing sleeve speed component) by the magnetic poles (between N1 and S4) of the fixed magnet 4b, thereby the developer 10 is rotated and moved.

The rotation of the developer rising like brush hair was examined in a test using a high speed imaging camera (Photron Co.: Faft Ultima uv) on the basis of such a concept. From the camera image, it was confirmed that the carrier particles risen like a brush were rotated/moved just like a chain before and after each magnetic pole in the developing area and rose vertically to the developing sleeve 4a very closely to a peak of each magnetic pole (N1, S4, etc.).

Furthermore, in order to make it clear that the developer was rotated by a magnetic pole component, black toner particles were mixed enough with magnetic carrier particles and stirred so as to be charged, then red toner particles were stuck on the surface of the developing sleeve 4a or at the tip of the risen portion of the carrier. After this, the developing sleeve 4a was rotated. Then, the state of the developer on the surface of the outer periphery of the developer and on the surface of the developing sleeve 4a were checked to find red toner particles gathered at the outer periphery of the developer at a portion around the peak of each magnetic pole and red toner gathered on the surface of the developing sleeve 4a alternately. This coincided with the draw data caught by the high speed imaging camera.

Furthermore, the state in the developing tank 3 was checked along the visualizing route using the camera to find that the developer was rotated surely due to an N pole or an S pole of the magnet 4b provided in the developing sleeve 4a. In addition, the developer was separated from the surface of the developing sleeve 4a at a repulsive magnetic field (S3–S2) portion and at a portion where the magnetic field component in the radial direction of the developing sleeve 4a was small (almost zero).

In order to solve the prior art problems, the disposition of the magnetic poles, especially that of the magnet 4b of the developing roller 4, as well as the rotation of the developer and geometric forms inside the developing apparatus were examined as described above. Hereunder, how the developer is fed in the present invention will be described.

(1) A developing process is performed corresponding to a static latent image potential formed on the photosensitive member 1 in the developing area (around the developing pole N1), then the developer is collected and fed sequentially into the developing tank 3 according to the rotation of the developing sleeve 4a.

(2) At this time, the center of each of the feeding poles S4 and N3 used for collecting a developer is shifted slightly from a position where the poles S4 and N3 come closest to the lower guide 3a of the developing tank 3. Furthermore, the developer is fed and collected by the separating pole S3 whose center is positioned in the direction of the developing tank 3.

(3) Passing the separating pole S3, the developer is separated from the surface of the developing sleeve 4a at the area between S2 and S3 where no magnetic poles are disposed in the developing sleeve 4a, so that the developer is mixed with newly supplied developer and stirred by the stirring & feeding roller 5. Thus, the amount of the toner particles is adjusted so that a fixed amount is always stuck on the surface of the carrier.

(4) The stirred developer is caught by the magnetic force of the sucking pole S2 on the developing sleeve 4a, then fed sequentially into the doctor 7 by the magnetic force distribution adjusting pole N2.

(5) In order to pass the developer on the developing sleeve 4a in a gap between the doctor 7 and the developing sleeve 4a without much stress, the magnetic force of the magnetic force distribution adjusting pole N2 in the radial direction is set so as to be reduced on the surface of the doctor 7 opposed to the outer peripheral surface of the developing sleeve 4a.

(6) After this, the developer is moved from the feeding pole S1 to the developing N1 for repeating the initial process (1).

In this invention, the developer, leaving the developing pole N1, rises like a chain as described above. Then, as shown in FIGS. 2A to 2C, the developer is moved to the next poles S4, N3, and S3 sequentially while being rotated and moved repetitively in units of a chain.

Hereunder, how the toner particles contained in the developer are consumed will be described with reference to FIG. 3. The developer 10 is rubbed against the photosensitive member 1, especially when fed to the developing area, that is, to a position opposed to the developing pole N1. Thus, the toner particles are transferred to a static latent image. Consequently, at the developing pole N1, the toner particles in the developer rising like a chain are consumed more at a position separated farthest from the developing sleeve 4a as described above. At this time, the developer 10 causes the toner density to be reduced at a position away from the developing sleeve 4a more than at a position close to the developing sleeve 4a.

Then, on the contrary to the developing pole N1, when the developer 10 is moved to the feeding pole S4, a lower density portion of the toner consumed in the chain comes to the surface of the developing sleeve 4a. The developer 10 is then moved to the auxiliary collecting pole N3 according to the same principle. And finally, when the developer 10 reaches the separating pole S3, a lower toner density portion in the chain comes to the surface of the developing sleeve 4a.

Consequently, in order to position the lower toner density portion in the chain on the surface of the developing sleeve 4a when the developer (shaped like a chain) reaches the separating pole S3, an even number of magnetic poles must be disposed between the developing pole N1 and the separating pole S3 in the rotational direction of the developing sleeve 4a in the magnet 4b provided in the developing sleeve 4a composing the developing roller 4. This will be understood clearly from the above description.

When the magnetic poles are disposed as described above, if a chain-like developer having density nonuniformity in the developing area (around the developing pole N1) is fed up to the separating pole S3, then the lower toner density portion is positioned on the surface of the developing sleeve. Thus, the developer 10 is separated from the developing sleeve 4a at a position where the magnetic force in the radial direction between the separating pole S3 and the sucking pole S2 becomes almost zero. At this time, no toner remains on the surface of the developing sleeve 4a.

As a result, the developer 10 is replaced at the next sucking pole S2 and only the developer charged in uniform by the stirring & feeding roller 5 is stuck on the developing sleeve 4a thereby to reduce blushing of images, as well as scattering of toner significantly.

Second Embodiment

In the above embodiment, the prior art problems are solved, that is, an object of the present invention is achieved by disposing an even number of magnetic poles between the developing pole N1 and the separating pole S3 in the magnet 4b composing the developing roller 4.

In this second embodiment, disposition of magnetic poles, as well as the strength of the magnetic force from each of those magnetic poles for stabilizing the effects described above will be described.

Figures 4A, 4B:
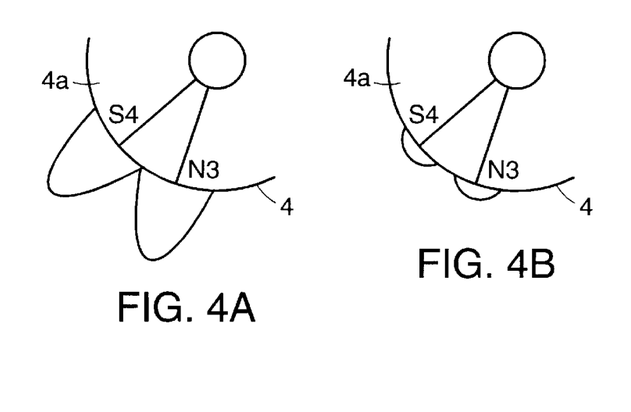
FIGS. 4A to 4C illustrate a state of the magnetic force and a state of the angle of each pole of the magnet composing a developing roller, to explain the second embodiment of the present invention.
Figure 4C:
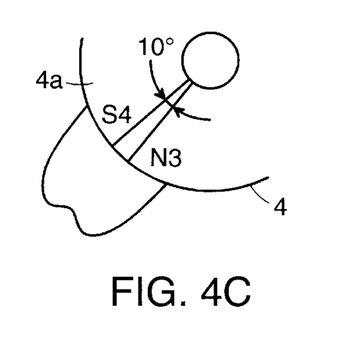

FIG. 4A to 4C indicates the magnetic force density distribution of each of the feeding pole S4 and the poles N3 when the developer is collected into the developing tank 3 after a developing process is ended. In other words, when the developer is rotated and moved properly as shown in FIG. 3 after a developing process is ended, the satisfactory effects described in the first embodiment can be expected. Thus, the magnetic force and the angle of the magnetic force for rotating and moving the developer become very important factors. Thus, when the magnetic force and the angle of the magnetic force are set properly, the following favorable effects can be obtained.

At first, the strength of a magnetic force will be described. As for this magnetic force strength, the minimum limit value of enabling the developer to rise like a chain and the risen developer to be rotated and moved was confirmed in a test.

The magnetic force strength was varied between opposite poles (N and S poles) in many ways thereby to find an area where the developer could be rotated like a chain. At this time, the angle (magnetic force angle) from the center of the developing roller between two poles was set to 30 degrees and the diameter of the developing roller 4 was 25 mm. The magnetic force strength was set identically between both poles. The test was performed in steps of 50 gausses within a magnetic force range of 0 to 200 gausses and in steps of 100 gausses within a magnetic force range of 200 to 1000 gausses.

The rotation of the developer rising like a chain was checked in the test using a high speed imaging camera (Photron Co.: Faft Ultima uv).

It was confirmed by the camera that the risen portion of the developer appeared at 100 gausses and over. The chain-like rotation of the developer was not smooth and the rotation was insufficient, however. It was a magnetic force of 200 gausses or over that the chain-like rotation was made smoothly. FIG. 4B indicates a magnetic force density distribution at 100 gausses. Consequently, in the case of the magnetic forces, the rotation and movement of a developer are restricted by a magnetic angle. At 100 gausses or so, however, there was a portion which is not affected by any magnetic force in a mutual magnetic force distribution. Thus, the developer was not rotated and moved properly.

Furthermore, the angle (magnetic force angle) from the center of the developing roller 4 between opposite magnetic poles (N and S poles) was changed to various values to find an area where it was possible to enable the developer to make a chain-like rotation. At this time, the magnetic force strength of the two poles was set to 400 gausses and the diameter of the developing roller 4 was 25 mm as described above. The test was performed in steps of 5 degrees within a magnetic force angle of 5 to 20 degrees and in steps of 10 degrees within a magnetic force angle of 20 to 100 degrees.

The rotation of the developer rising like a chain was checked in the test using a high speed imaging camera (Photron Co.: Faft Ultima uv).

It was confirmed by the camera that a chain-like rotation of the developer appeared at 10 degrees or over. The chain-like rotation of the developer was not smooth and the rotation was insufficient, however. It was a range of a magnetic force angle of 15 to 80 degrees that the chain-like rotation was made smoothly. In this case, at 90 degrees or over, it was difficult to feed the developer. FIG. 4C indicates a magnetic force density distribution at an angle of 10 degrees between magnetic poles. In such a distribution, however, the developer was not rotated and moved. Thus, the developer was not rotated as shown in FIG. 3.

Consequently, it has been proved that the effects described in the first embodiment can be more improved by setting the magnetic force strength of the magnet 4b provided in the developing sleeve 4a composing the developing roller 4 and the angle (magnetic force angle) from the center of the developing roller 4 properly.

In this case, it is, for example, when the developer is fed to the developer separating position (between S3 and S2 poles) in the developing tank 3 after a developing process is ended that the developer must be fed by rotation/movement without fail. Thus, when the developer 10 is rotated and fed as shown in FIG. 2A to 2C, the developer remaining on the surface of the developing sleeve 4a, after the toner is consumed, can be separated from the sleeve without fail as shown in FIG. 3. Consequently, the effects as described above are expected when the angle between magnetic poles and the magnetic force strength are set properly.

As for the magnet 4b, the magnetic force and each pole angle are set to rotate and feed the developer 10 properly as shown in FIG. 2A to 2C. In this case, the magnetic force should be set to the minimum value for rotating and feeding the developer. In other words, the magnetic force is minimized to prevent scattering of toner when the developer hits a lower guide 3a of the developing tank 3 when in collecting of the developer. Thus, the effects described above can be obtained.

Third Embodiment

Next, another embodiment of the present invention for solving the prior art problems will be described. In this embodiment, the disposition of the magnetic forces of the magnet 4b will be focused to stabilize the image quality by stabilizing the developing process especially using the developing roller 4.

In other words, in this embodiment, an even number of magnetic poles are disposed between the sucking pole S2 and the developing pole N1 as shown in FIG. 1. With such the disposing of magnetic poles, images can be developed stably without degradation. Hereunder, the details of such a processing will be described.

At first, flowing of the develope r, especially how the developer is fed in the developing apparatus 2 shown in FIG. 1 will be described.

(1) The developer stirred by the stirring & feeding roller 5 is held on the developing sleeve 4a by the sucking pole S2 magnetically, then fed by the magnetic force distribution adjusting pole N2 into the docto r 7.

(2) In order to pass the developer on the developing sleeve 4a through a gap between the doctor 7 and the developing sleeve 4a with less stress, the magnetic poles are disposed so as to reduce the magnetic force in the radial direction on the surface of the doctor 7 opposed to the outer peripheral surface of the developing sleeve 4a.

(3) The developer is moved from the feeding pole S1 to the developing pole N1 and a developing process is performed corresponding to the static latent image potential of the photosensitive member 1 in the developing area (around the developing pole N1). Then, the developer is fed and collected according to the rotation of the developing sleeve 4a sequentially into the developing tank provided with the stirring & feeding roller 5.

(4) The center of each of the feeding pole S4 and the pole N3 is shifted from the position where the pole comes closest to the lower guide of the developing tank 3. In addition, the developer is fed and collected into a hopper by the separating pole S3 whose center is in the direction of the developing tank 3.

(5) Passing the separating pole S3, the developer is separated from the developing sleeve 4a at the area between the poles S3 and S4 where no magnetic poles are disposed in the developing sleeve 4a. Then, the stirring & feeding roller 5 stirs the developer with newly supplied developer so as to adjust the amount of the toner to be stuck on the surface of the carrier at a fixed value.

(6) The developer stirred enough by the stirring & feeding roller 5 is held on the developing sleeve 4a by the sucking pole S2 for repeating the initial process (1).

Figures 5, 6:
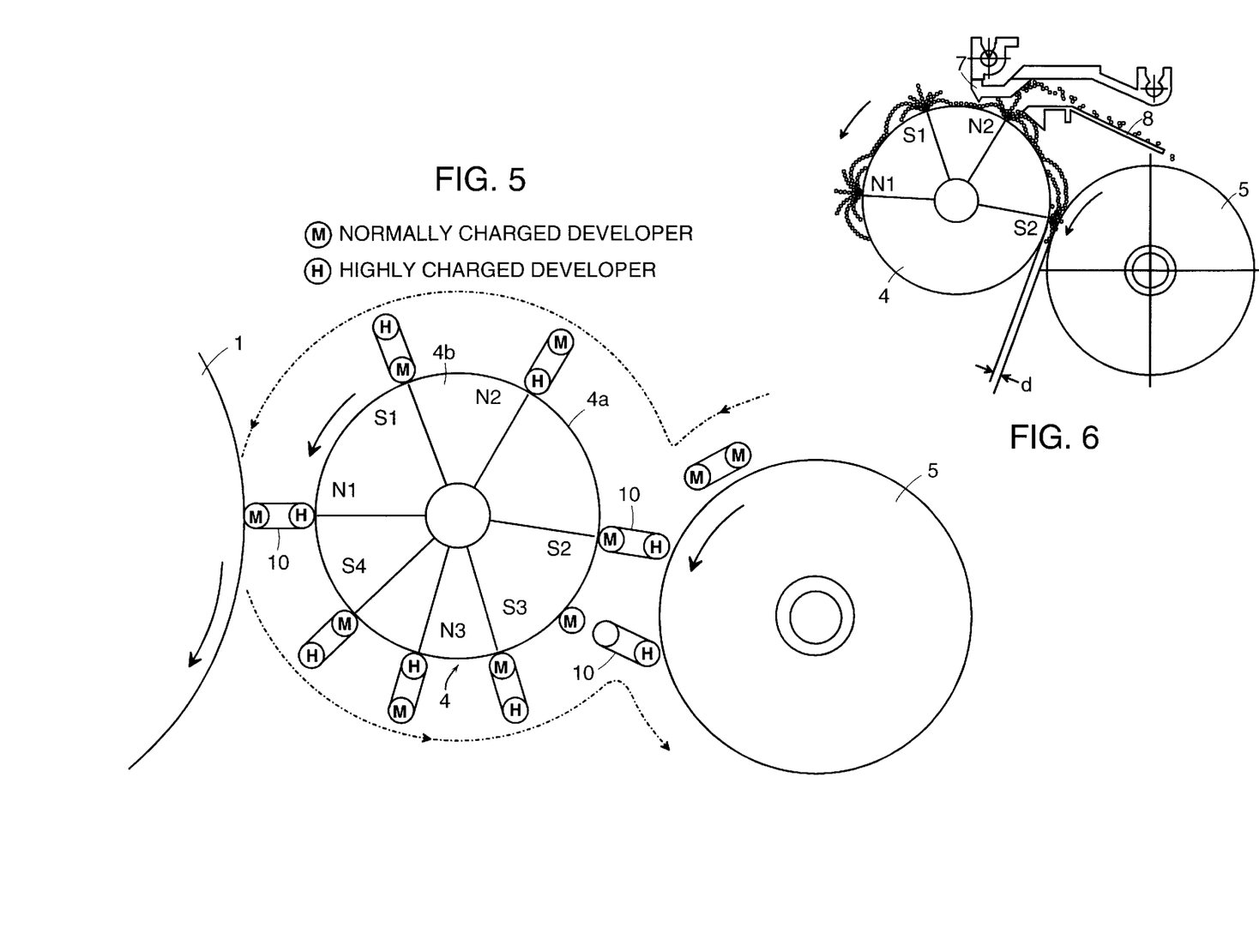
FIG. 5 illustrates a relationship between a state of charged toner particles in the developer and how the developer is fed, to explain the third embodiment of the present invention.
FIG. 6 illustrates how the developer is fed, to explain the fourth embodiment of the present invention.

In the present invention, as shown in FIG. 5, the developer 10 is rubbed against the stirring & feeding roller 5 at the sucking pole S2 so as to charge the toner in the developer 10 much more at a position away from the surf ace of the developing sleeve 4a. Then, each time the developer 10 is fed and restricted by each pole, the developer rises like a chain at each pole and each of the chains is rotated as described in the first embodiment. Thus, the toner rubbed against the stirring & feeding roller 5 and charged highly is positioned around the surface of the developing sleeve 4a and this highly charged toner is prevented from being used for developing in the developing process.

Furthermore, when the developer 10 reaches the separating pole S3 after the developing process is ended, this highly charged toner is positioned farthest from the surface of the developing sleeve 4a. Thus, this highly charged toner does not remain on the surface of the developing sleeve at a position where the magnetic force in the radial direction between the separating pole S3 and the sucking pole S2 becomes zero.

When the magnetic poles of the magnet 4b are disposed as described above, the toner in the developer rubbed against the stirring & feeding roller 5 is charged highly at the sucking pole S2 and not used in the developing process. Thus, density nonuniformity to appear in images of a half-tone original is reduced significantly. In other words, the stripes as shown in FIG. 11 are eliminated, so that high quality images can be obtained.

Furthermore, after a developing process is ended, the same number of the magnetic poles in the magnet 4b as the first embodiment is disposed. And, since highly charged toner is separated completely from the surface of the developing sleeve 4a of the developing roller 4 at a position where the magnetic force becomes almost zero, only the developer stirred in uniform by the stirring & feeding roller 5 enough is stuck on the developing sleeve 4a at the next sucking pole S2. Thus, the prior art problems such as nonuniformity and flushing in images are reduced significantly.

Fourth Embodiment

Next, the fourth embodiment of the present invention will be described with reference to FIG. 6. This embodiment is for reducing damages of developer, especially degradation of developer at the doctor 7 that limits the amount of developer specially.

For this purpose, as shown in FIG. 6, a gap d between the stirring & feeding roller 5 and the developing sleeve 4a is set to about 1.4 mm in this invention. This is because the size is matched approximately to a range in which the stirring & feeding roller 5 can come in contact with the tip of the risen portion of the developer at the sucking pole S2.

If the gap d is narrower than the range, the amount of the developer to be stuck on the sucking pole S2 is extremely reduced. Thus, the developing performance in the developing area is degraded, causing the image density to be lowered. On the contrary, if the gap d is wider than the range, the amount of the developer to be stuck on the sucking pole S2 can not be limited. Thus, even the doctor 7 cannot keep the amount of developer, that is, the layer thickness (amount of developer stuck on the developing sleeve 4a) at a fixed value any longer, causing nonuniformity in the density of images. In addition, the developer separated at a position where the magnetic force in the radial direction between the separating pole S3 and the sucking pole S2 becomes almost zero is not collected into the stirring & feeding roller 5. The developer is thus stuck on the sucking pole S2 directly, so that developer cannot be replaced with new one smoothly.

Since the developer makes a chain-like rotation between opposite poles (N and S poles) if the movement of the developer is in accordance with the concept in the third embodiment described above, an even number of magnetic poles are disposed between those opposite poles to prevent the toner charged highly at its tip by the stirring & feeding roller 5 from being used for developing in the developing area.

In order to make it more effective, there should not be any member other than the stirring & feeding roller 5 between the sucking pole S2 and the developing pole N1 for charging the developer more.

For example, if a doctor 7 and another plate-like member such as a current plate 8 for returning the developer to the stirring & feeding roller 5 after it is removed from the developing sleeve 4a so as to be limited in amount, is pressed strongly against a portion around the risen portion of the developer, the developer is exposed to a high pressure and causes packing. Thus, the toner is stuck and the carrier particles are spent (a phenomenon that toner is not stuck on carrier) faster.

By using the stirring & feeding roller 5 as a member for charging the developer most effectively when the number of magnetic poles described in the third embodiment is adopted such way, the effects described above can be more improved.

Fifth Embodiment

In order to improve the effects more in each of the embodiments, the developer must be separated completely at a position where the magnetic force in the radial direction between the separating pole S3 and the sucking pole S2 becomes almost zero. Consequently, the developer collected after a developing process is ended can be separated from the surface of the developing sleeve 4a without fail, and accordingly the developer stirred by the stirring & feeding roller 5 and charged newly to a fixed level and stuck by a fixed amount of toner particles can be supplied to the developing sleeve 4a. As a result, the developing state can be stabilized very much, preventing image and density from nonuniformity, as well as preventing stripes to appear in half-tone images. Stable quality images are thus available.

In this embodiment, a test was performed by focusing on the relationship of magnetic forces between the separating pole S3 and the sucking pole S2, affecting the performance for separating of the developer significantly.

The developing roller 4 used in this test was a roller in accordance with the parameters shown in Table 1. The effect of the developing roller was checked with a half-tone image sample. In addition, the test used a developing roller 74 for which magnetic poles were disposed in the same way as those of the prior art developing apparatus shown in FIG. 7.

TABLE 1

| | Magnetic Force of N3 (Gausses) | | | | | | |
|---|---|---|---|---|---|---|---|
| Magnetic Force of N4 (Gausses) | 600 | 500 | 450 | 400 | 350 | 300 | 200 |
| 600 | 3 | 4 | | 4 | | 5 | |
| 500 | 3 | 3 | 3 | 4 | 4 | 4 | 5 |
| 450 | | | | | 4 | | |
| 400 | 2 | | 2 | 3 | | 4 | |
| 350 | | 2 | | | 3 | | |
| 300 | 1 | | 1 | | | 3 | 4 |
| 200 | | 1 | | 2 | 2 | | 3 |

The image obtained in the test was evaluated in 5 steps. "1" was given to an image whose quality was the worst with image nonuniformity among the sample images in the test and "5" was given to an image whose quality was excellent with no nonuniformity.

The strength of the magnetic force from each pole other than the separating pole N4 and the sucking pole N3 was set as follows; the developing pole N1 is 1000 gausses, the feeding pole S1 is 800 gausses, the adjusting pole N2 is 450 gausses, the auxiliary pole S2 is 550 gausses, and the collecting pole S3 is 900 gausses. Each of the magnetic poles was disposed in the same way so that no parameter difference appears from the magnetic poles.

From the test result, it was found that the magnetic force in the developing roller eliminated nonuniformity in images if the magnetic force of the separating pole N4 was higher than the magnetic force of the sucking pole N3, assuring a satisfactory image quality. In addition, it was examined what factor was effective for separating the developer effectively at a position where the magnetic force in the radial direction between the separating pole N4 and the sucking pole N3 became almost zero when the magnetic force of the separating pole N4 was set higher than the magnetic force of the sucking pole on the basis of the test result.

At first, the magnetic force distribution between the separating pole N4 and the sucking pole N3 is varied as follows; when the magnetic force of the separating pole N4 is set higher than the magnetic force of the sucking pole N3, the magnetic force in the radial direction of the separating pole N4 becomes wider and the magnetic force in the radial direction of the sucking pole N3 becomes narrower. Consequently, it was found that the position where the magnetic force in the radial direction between the separating pole N4 and the sucking pole N3 became almost zero was shifted toward the sucking pole N3.

When this shifting was checked visually while the developer was removed completely from the developing tank provided in the developing apparatus and the developer was stuck all along the periphery of the developing roller strongly, it was found that when the magnetic force of the separating pole N4 was set higher than the magnetic force of the sucking pole N3, the developer was stuck on the separating pole N4 wider and risen higher according to the width of the magnetic force in the radial direction of the separating pole N4, increased more than the state of other respective test parameters, and accordingly, the developer was pushed out toward the stirring & feeding roller, so that the developer was separated completely after a developing process is ended.

Consequently, the present invention is effective especially for stabilizing the image quality when in developing, since the magnetic force of the separating pole S3 is set higher than the magnetic force of the sucking pole S2 at the separating pole S3 and the sucking pole S2 when the magnetic forces of the magnet 4a are disposed by the developing roller 4.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electrostatic latent image developing apparatus comprising:

a developer tank defining an interior adapted for containing toner particles and magnetized carrier particles, and for imparting an electrostatic charge to at least some of said toner particles;

a hollow, cylindrical developing sleeve, said developing sleeve being rotatably drivable about its longitudinal axis in a first direction, and defining an outer surface in communication with said interior of said developer tank at, at least a first location;

an electrostatic latent image bearing member defining a surface adapted to have an electrostatic latent image formed thereon, said surface being closely spaced to said outer surface of said developer sleeve at a second location substantially opposite to said first location;

a stationary magnet fixedly disposed inside said rotatable developing sleeve, said magnet defining a number of magnetic poles circumferentially spaced about the longitudinal axis of said developing sleeve;

said magnetic poles including:

a developing magnetic pole having a first polarity located substantially adjacent to said second location;

a developer separating magnetic pole and a developer sucking magnetic pole both having the same second polarity, opposite to said first polarity, located circumferentially adjacent to one another, with said developer sucking magnetic pole being located downstream in said first direction from said developer separating magnetic pole substantially adjacent to said first location;

a first even number of intermediate magnetic poles of alternating polarities located in circumferentially spaced relation to one another between said developing magnetic pole and said separating magnetic pole such that the polarity of said first even number of intermediate magnetic poles alternates between said second polarity and said first polarity in said first direction between said developing magnetic pole and said developer separating magnetic pole, and a second even number of intermediate magnetic poles of alternating polarity located in circumferentially spaced relation to one another such that the polarity of said second even number of magnetic poles alternates between said first polarity and said second polarity in said first direction between said sucking magnetic pole and said developing magnetic pole; and a doctor element for limiting the thickness of said layer of developer layer carried by said sleeve, wherein said doctor element is adapted to interact with a of developer located on said developer sleeve approximately midway between a pair of said second even number of alternating polarity magnetic poles located between said developer sucking magnetic pole and said developing magnetic pole;

wherein the speed of rotation of said developer sleeve, and the spacing, magnitude and direction of the magnetic force provided by said magnetic poles are selected such that (1) the rise of developer magnetically adhered to said surface of said developing sleeve is small between adjacent magnetic poles; (2) said developer undergoes a chain-like rotation on said surface of said developer sleeve upon passing each of said magnetic poles; (3) toner is transferred from said developer on the surface of said developer sleeve to said latent image bearing member at said second location when said latent image bearing member has an electrostatic image formed thereon; and (4) the area of said developer having the weakest charge abuts said developer sleeve surface in the vicinity of said developer separating magnetic pole.

2. The electrostatic latent image developing apparatus according to claim 1 wherein there are a total of six magnetic poles.

3. The electrostatic latent image developing apparatus of claim 1 wherein the magnetic force strength of each magnetic pole is at least 200 gauss.

4. The electrostatic latent image developing apparatus of claim 1 wherein the magnetic force angle at any of said magnetic poles is between about 15° and about 80°.

5. The electrostatic latent image developing apparatus of claim 1, wherein the magnetic force generated in the gap between the developer separating magnetic pole and the developer sucking magnetic pole measured in said first direction is almost zero such that substantially no developer remains on the surface of the developing sleeve immediately upstream of said developer separating magnetic pole.

6. The electrostatic latent image developing apparatus of claim 1, further comprising a rotating member disposed in said developer tank opposite said first location for stirring and supplying the developer to the developing sleeve;

said rotating member being adapted to cause the toner in said delivered developer located furthest from said developing sleeve to assume a high and substantially uniform electrostatic charged state.

7. The electrostatic latent image developing apparatus of claim 1 wherein the magnetic force generated by the developer separating magnetic pole is stronger than the magnetic force generated by the developer sucking magnetic pole.

* * * * *

UNITED STATES PATENT AND TRADEMARK OFFICE
CERTIFICATE OF CORRECTION

| | |
|---|---|
| PATENT NO. | : 6,041,207 |
| DATED | : March 21, 2000 |
| INVENTOR(S) | : Y. Ishiguro et al. |

It is certified that error appears in the above-identified patent and that said Letters Patent is hereby corrected as shown below:

<u>Title page,</u>
In the Title of the Invention "[54] APPARATUS FOR CONTROLLING THE MOVEMENT OF MAGNETIZED DEVELOPER MATERIAL IN A LATENT, ELECTROSTATIC IMAGE DEVELOPING DEVICED", please replace the word "DEVICED" with -- DEVICE --.

The Foreign Application Priority Information is missing. Please insert
-- [30] Foreign Application Priority Data
      August 26, 1997 [JP] Japan......... 9-228995 --.

Signed and Sealed this

Fifth Day of February, 2002

*Attest:*

JAMES E. ROGAN
*Director of the United States Patent and Trademark Office*

*Attesting Officer*